United States Patent
McNeese et al.

(10) Patent No.: US 10,362,135 B2
(45) Date of Patent: Jul. 23, 2019

(54) MONITORING HIGHLY DISTRIBUTED COMPUTER SYSTEMS

(71) Applicant: Experian Health, Inc., Franklin, TN (US)

(72) Inventors: Brian McNeese, Columbia, TN (US); Edmond Chase Pilkington, Rockvale, TN (US); David Stephen Phoebus, Nashville, TN (US); Jeffery Henson, Thompson Station, TN (US); Jason Harrison Wallis, Spring Hill, TN (US); Michael Peter Ochs, Franklin, TN (US)

(73) Assignee: EXPERIAN HEALTH, INC, Franklin, TN (US)

( * ) Notice: Subject to any disclaimer, the term of this patent is extended or adjusted under 35 U.S.C. 154(b) by 199 days.

(21) Appl. No.: 15/438,308

(22) Filed: Feb. 21, 2017

(65) Prior Publication Data

US 2018/0241835 A1    Aug. 23, 2018

(51) Int. Cl.
*H04L 12/24* (2006.01)
*H04L 12/26* (2006.01)
*H04L 29/08* (2006.01)

(52) U.S. Cl.
CPC ...... *H04L 67/2842* (2013.01); *H04L 41/0273* (2013.01); *H04L 43/045* (2013.01); *H04L 43/0823* (2013.01); *H04L 67/1097* (2013.01); *H04L 43/16* (2013.01)

(58) Field of Classification Search
None
See application file for complete search history.

(56) References Cited

U.S. PATENT DOCUMENTS

| | | | | |
|---|---|---|---|---|
| 6,088,730 | A * | 7/2000 | Kato | G06F 1/1632 709/227 |
| 7,117,275 | B1 * | 10/2006 | Ofek | G06F 3/0613 710/33 |
| 9,577,893 | B1 * | 2/2017 | Havemose | G06F 9/4856 |
| 9,762,701 | B1 * | 9/2017 | Havemose | H04L 67/42 |
| 2004/0243343 | A1 * | 12/2004 | Nelson | G06Q 40/06 702/182 |
| 2007/0208992 | A1 * | 9/2007 | Koren | G06Q 10/10 715/212 |
| 2013/0227051 | A1 * | 8/2013 | Khakpour | H04L 67/2842 709/213 |
| 2014/0095804 | A1 * | 4/2014 | Lientz | H04L 67/06 711/144 |

(Continued)

*Primary Examiner* — Brian Whipple
(74) *Attorney, Agent, or Firm* — Merchant & Gould

(57) ABSTRACT

Aspects described herein pertain to monitoring and/or remediating operational components distributed throughout a distributed computer architecture, but is not so limited. A disclosed system provides monitoring information associated with a plurality of monitored server computers, wherein the monitoring information includes processing data, storage data, control data, and/or error data to quantify an operational state of one or more of the monitored server computers. A disclosed method monitors information associated with a plurality of monitored server computers, wherein the monitoring information includes processing data, storage data, control data, and the error data to quantify an operational state of one or more of the monitored server computers.

20 Claims, 9 Drawing Sheets

(56) References Cited

U.S. PATENT DOCUMENTS

| | | | |
|---|---|---|---|
| 2014/0181241 A1* | 6/2014 | Manula | H04L 67/1097 709/217 |
| 2014/0357235 A1* | 12/2014 | Zhang | H04M 7/006 455/412.1 |
| 2018/0006871 A1* | 1/2018 | Yang | H04L 41/0853 |

* cited by examiner

MONITORING HIGHLY DISTRIBUTED COMPUTER SYSTEMS

BACKGROUND

Highly distributed computing environments typically include hundreds if not thousands of physical and/or virtual server machines. Operational issues inevitably arise due in part to the large number and distribution of computing resources throughout the distributed computer architecture. Operational problems may be caused by significant hardware memory and disk space usage, disk errors, network hardware issues, insufficient or misconfigured hardware and/or software components, malfunctioning hardware and/or software components (e.g., disk(s), memory, central processing units (CPUs), chipset(s), network gateways, etc.), and/or incorrect or improper requests for processing resources. For example, upon reaching a processing and/or storage capacity (e.g., hard disk use and/or speed), a server machine may bog down other server machines and/or cause performance degradation across all or some portion of the distributed computer architecture. Thus, it becomes critical to identify underlying server machine issues and/or other operational issues as quickly as possible in order to maintain the integrity of the distributed computer architecture.

BRIEF SUMMARY

The present disclosure describes aspects of monitoring and/or remediating operational components distributed throughout a distributed computer architecture, but is not so limited. A system of an embodiment provides monitoring information associated with a plurality of monitored server computers, wherein the monitoring information includes processing data, storage data, control data, and/or error data to quantify an operational state of one or more of the monitored server computers. A method of an embodiment provides monitoring information associated with a plurality of monitored server computers, wherein the monitoring information includes processing data, storage data, control data, and the error data to quantify an operational state of one or more of the monitored server computers. Additional aspects and embodiments are disclosed.

This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the present invention.

DETAILED DESCRIPTION

Figure 1:
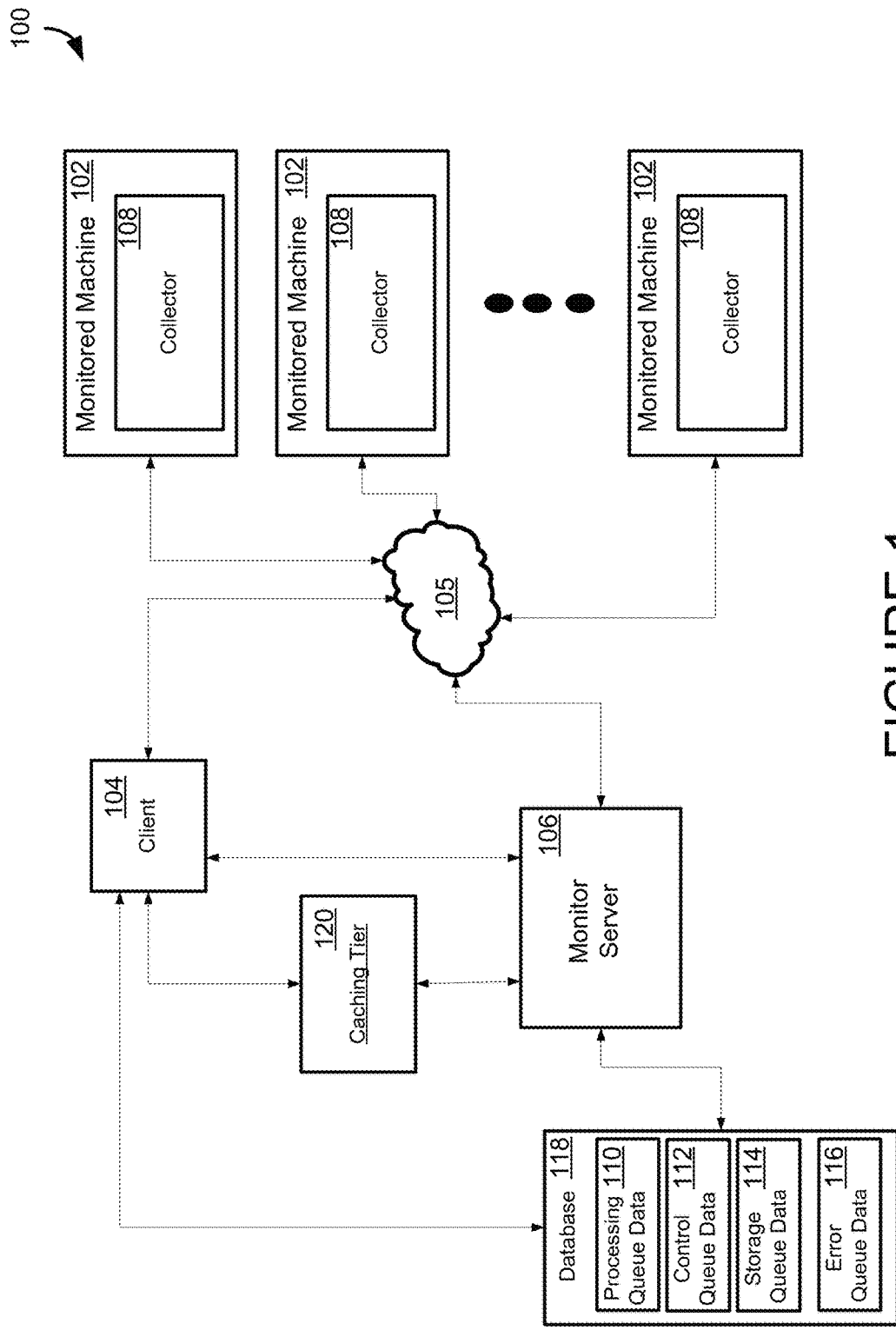
FIG. 1 is a block diagram that depicts a system that provides real-time monitoring of physical server computers and/or virtual server computers distributed throughout a distributed computer architecture, according to an embodiment.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, subtracting, and/or adding operations to the disclosed methods. Accordingly, the following detailed description does not limit the present disclosure, but instead, the proper scope of the present disclosure is defined by the appended claims. The following detailed description is, therefore, not to be taken in a limiting sense.

FIG. 1 is a block diagram that depicts a system 100 that provides real-time monitoring of physical server computers and/or virtual server computers (referred to as monitored machine(s) 102) distributed throughout a distributed computer architecture according to an embodiment, but is not so limited. The system 100 of an embodiment is configured to monitor processing performance metrics, capacity metrics, processing backlogs, application and code-level errors/metrics, and/or other operational issues associated with the monitored machine(s) 102 and distributed computer architecture. As described further below, the system 100 includes a client 104 that operates in part to provide a monitor user interface (UI) (see dashboard UI 400 of FIGS. 4A-4D) that displays a real-time or near real-time visual representation of an operational state of one or more of the monitored machine(s) 102.

Client 104 of one embodiment comprises a browser or other web interface that enables client 104 to access, via network(s) 105, a website provided by a monitor server 106 or some other server computer to display statistical and real or near-real time data and/or automatically execute or queue a remediation action to remediate an operational issue revealed by the monitored data. The website of one embodiment operates to poll for information collected by collectors 108 and provides feedback to client 104. The website allows users to connect with any device/system to visualize real-time operational issues and/or statistical data associated with the monitored machine(s) 102. While a single client 104 and monitor server 106 are depicted in FIG. 1, it will be appreciated that system 100 typically include multiple clients 104, monitor servers 106, and/or other components.

As one implementation example, system 100 can be configured to monitor performance and/or other operational aspects of a transaction/message processing clearinghouse and/or other distributed/load-balanced computing environment that includes hundreds if not thousands of physical machines each including dedicated processors, disks, flash memory, etc., which contribute to distributed processing operations. System 100 is extensible and can be used with different types of endpoint devices/systems. It will be appreciated that modern complex computer and communication architectures include a variety of hardware, software, and/or firmware that provide wired and/or wireless networked communication functionality to devices, systems, applications, etc.

With continuing reference to FIG. 1, system 100 includes the monitor server 106 that receives collected information, including queue-related data, from the collectors 108 of the monitored machine(s) 102 for storing in database 118 and/or caching tier 120. While shown separately, the database 118 and/or caching tier 120 can be integrated with the monitor server 106 or some other component of system 100 (e.g., database server, caching server, etc.). Database 118 can be used for long term data storage needs and the caching tier 120 can be used to efficiently provide the most recent monitoring data for use in monitoring operational states of the monitored machine(s) 102.

The database 118 of an embodiment uses a database schema to deploy threat management or risk assessment variables, such as adjustable triggering thresholds, to generate alerts, dashboard visualization features, and/or automated actions associated with operational and/or other issues of the distributed computer architecture. For example, triggering thresholds can be used to prompt a reconfiguration of a threat management display (see dashboard UI 400 of FIGS. 4A-4D for example) and/or determine an appropriate remediation action to perform manually and/or automatically, etc. The database 118 of one embodiment includes first and second triggering thresholds for the processing queue data 110, first and second triggering thresholds for the control queue data 112, first and second triggering thresholds for the storage queue data 114, and/or first and second triggering thresholds for the error queue data 116 as part of quantifying an operational state of the distributed computer architecture. A configuration database can be deployed for each application service or process to be monitored.

According to one embodiment, system 100 uses a monitor algorithm that uses the first and second triggering thresholds in conjunction with most recent processing queue data 110, control queue data 112, storage queue data 114, and/or error queue data 116 to quantify an operational state of the each monitored machine 102. If a monitored value is equal to or above the first triggering threshold, the algorithm flags a corresponding issue as a medium risk or medium priority and moves a displayed widget associated with a monitored server computer to a medium risk or threat assessment zone. If a monitored value is equal to or above the second triggering threshold, the algorithm flags a corresponding issue as a high risk or high priority and moves a displayed widget associated with the monitored server computer to a high risk or threat assessment zone.

Accordingly, when a triggering threshold is reached, system 100 can alert users to an underlying issue causing the triggering and/or cause automatic execution of targeted remediation procedures. For example, when a value of the processing queue data 110 crosses a certain threshold level due to a hardware failure of a worker node server, the system 100 can operate to automatically redirect work to one or more other processing nodes or send an alert message to a network manager or other user or component. As another example, if the storage queue data 114 crosses a certain threshold level due to insufficient disk capacity, the system 100 can operate to automatically store completed work in a backup hardware data store. As will be appreciated, the monitoring features provided by system 100 allow for scaling up by increasing the capacity of existing servers or scaling out by adding additional servers to the topology of the distributed computer architecture.

With continuing reference to FIG. 1, the system 100 utilizes each collector 108 to collect various data points off of its monitored machine 102 to provide a risk or threat assessment in determining whether to add hotspots, reduce hotspots, upgrade hardware/software, replace hardware/software, implement preventative measures to prevent system outages, etc. For example, collectors 108 can use an application program interface (API) to monitor operating code and/or detect when an application service or process begins executing, stops executing, and log exceptions upon reaching a triggering threshold. The system 100, via collectors 108, can collect statistical data for trend visualization to gain a baseline of application or code performance of monitored machine(s) 102. For example, collectors 108 can collect statistical data (e.g., an average, a maximum, a minimum, etc.) for each one of the processing queue data 110, the control queue data 112, the storage queue data 114, and/or the error queue data 116 to use when providing a trending chart or graph visualization.

Monitor server 106 of one embodiment employs a web service to load trend data associated with a monitored session from database 118; as well as extracting the most recent (e.g., about every 5 seconds) processing queue data 110, most recent control queue data 112, most recent storage queue data 114, and/or most recent error queue data 116 from the caching tier 120 to populate a UI associated with client 104. As described further below, output provided by monitor server computer 106 can be used as threat assessment or risk management variables to drive other processes and/or identify hardware and/or software issues affecting operation of monitored machine(s) 102 and/or system 100. For example, programming code providing the functionality of collector 108 can be installed on each monitored machine 102 to collect queue-related data which can, in turn, be used to populate a threat or risk assessment visualization and/or automatically identify and/or remediate operational issues associated with each monitored machine 102.

According to an implementation example, each monitored machine 102 includes an installed collector 108 configured as executable instructions that operate to collect queue-related data from the monitored machine 102 on an ongoing basis while monitoring. By employing a collector 108 locally with each monitored machine 102, data communication transit times may be optimized to further enhance real-time threat assessment capability of system 100. Collector 108 of one embodiment is configured to collect processing queue data 110, control queue data 112, storage queue data 114, and/or error queue data 116 associated with each monitored machine 102 which is stored in database 118.

As used herein, the term "machine" refers to a physical article such as various endpoint systems and/or devices that use networked communication functionality to communicate and/or transfer data. Exemplary systems and/or devices may include physical server computers, server racks, desktop or laptop computers, tablets, network access devices, memory storage devices (e.g., disks, flash, solid state), etc. According to one functional implementation, a machine includes, but is not limited to having, a power supply, power control circuitry to control and regulate use of an external or internal power supply, processing and/or memory resources, such as a central processing unit, microprocessor, etc., advanced integrated circuitry, graphics processing hardware, networking hardware for wired and/or wireless configurations, an operating system, screen or display, I/O components, etc.

Network(s) 105 can include a variety of networks, such as a local area network (LAN) (e.g., a company Intranet), a wide area network (WAN) (e.g., the Internet or the World Wide Web), etc., accessed via a variety of couplings or connections and/or protocols including, but not limited to, landlines, LAN or WAN links (e.g., 802.11, T1, T3, 56 kb, X.25, etc.), broadband connections (e.g., ISDN, Frame Relay, ATM, etc.), HTTP, ICA, TCP/IP, IPX/SPX, NetBIOS, Ethernet, RS232, direct asynchronous connections, wireless connections, etc.

Figure 2:
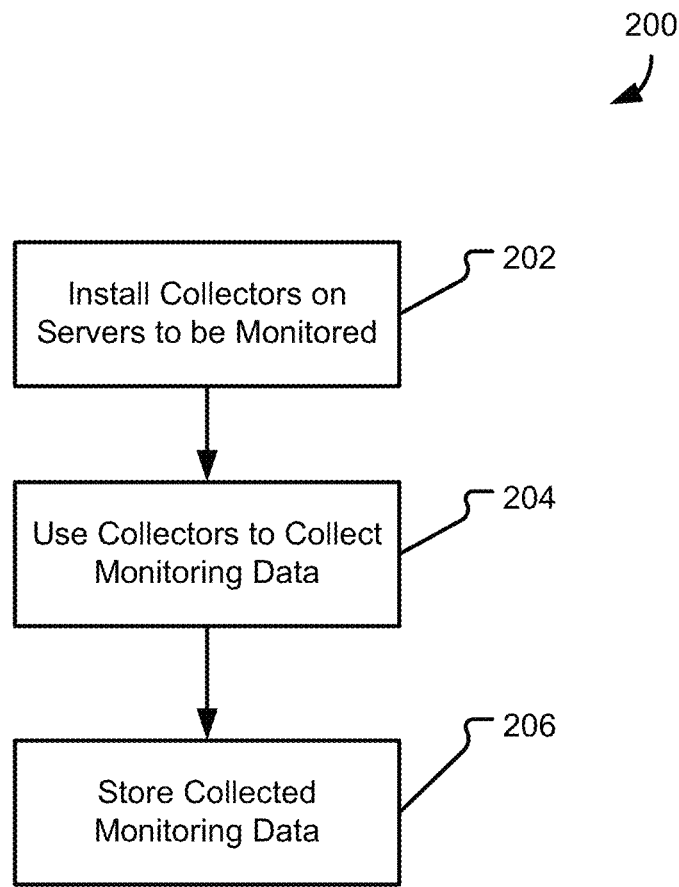
FIG. 2 is flow diagram that depicts a process of using collectors to collect queue-related data, statistical data, and/or other data from monitored machines, according to an embodiment.

FIG. 2 is flow diagram that depicts a process 200 of using the collectors 108 to collect queue-related data, statistical data, and/or other data from the monitored machines 102, according to an embodiment. The process 200 at 202 of an embodiment begins when a collector 108 is installed on a corresponding monitored machine 102. For example, programmatic code that provides the data collection functionality of collector 108 can be loaded on a dedicated worker node of a distributed computer architecture. At 204, the process 200 operates to use installed collectors 108 to collect queue-related data, statistical data, and/or other data from the monitored machines 102. For example, after installing the collector code, powering up, establishing a network connection, and connecting to one or more networks (e.g., network(s) 105), a collector 108 can collect performance and/or queue metrics, such as processing queue data 110, control queue data 112, storage queue data 114, error queue data 116, statistical data (e.g., averages, minimums, maximums, etc.), data collection times, server names and/or types, etc. At 206, the process 200 operates to store the collected data. For example, the process 200 at 206 can operate to store the collected data to a database server (e.g., database 118) according to a database schema and/or a caching data structure (e.g., caching tier 120).

Figure 3:
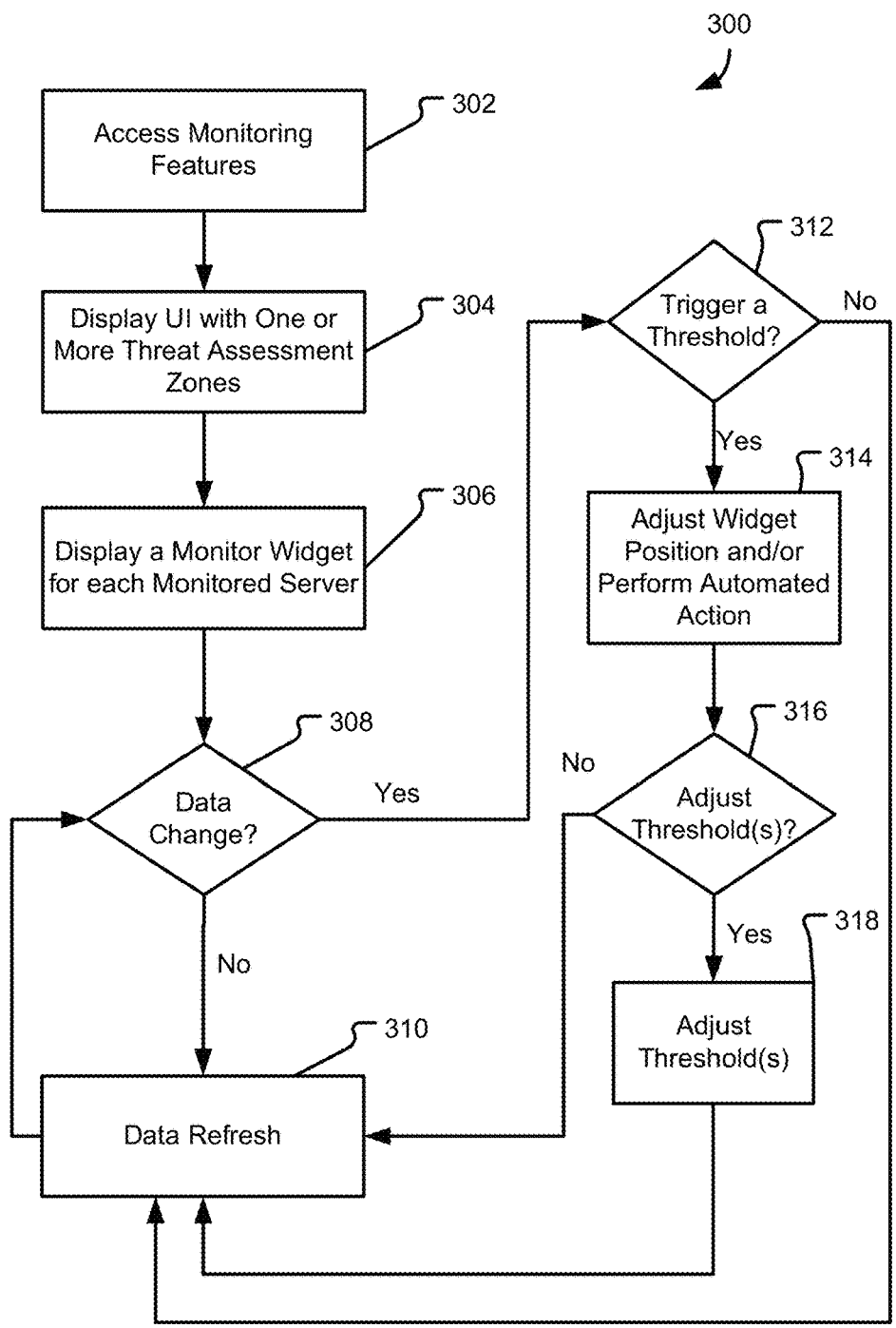
FIG. 3 is a flow diagram that depicts a process of monitoring aspects of a highly distributed computer architecture, according to an embodiment.

FIG. 3 is a flow diagram that depicts a process 300 of monitoring aspects of a highly distributed computer architecture, according to an embodiment. As shown in FIG. 3, the process 300 starts at 302 upon accessing a website or launching an application to monitor operational aspects of a highly distributed computer architecture to determine if there are any existing or potential operational issues. For example, a website or a monitor application can be built and used in order to gather and visualize processing queue data 110, control queue data 112, storage queue data 114, and/or error queue data 116 associated with worker server computers distributed throughout the highly distributed computer architecture. As described further below, the monitored information can be used to provide real-time visualizations as well as to invoke automated remediation actions.

At 304, the process 300 operates to display a monitoring UI (e.g., dashboard UI 400 of FIGS. 4A-4D) that includes one or more of a plurality of risk or threat assessment zones used as part of quantifying the monitored information. For example, the monitoring UI can be configured to display a low priority threat assessment zone for containing low-level threats, a medium priority threat assessment zone for containing medium-level threats, and a high priority threat assessment zone for containing high-level threats. At 306, the process 300 operates to display one or more monitoring widgets in one or more of the low priority threat assessment zone, the medium priority threat assessment zone, and/or the high priority threat assessment zone, wherein each monitoring widget includes queue-related detectors and associated triggering thresholds. A monitoring widget of one embodiment is associated with each monitored machine and includes: a name of a server computer being monitored, a name of an application service or process being monitored, four queue-related detectors associated with a processing queue, a control queue, a storage queue, and/or an error queue that display first and second triggering thresholds and current values associated with the processing queue data 110, the control queue data 112, the storage queue data 114, and the error queue data 116 (see FIGS. 4A-4D for example).

If there are no data changes at 308, the process 300 proceeds to 310 and calls for a data refresh operation. For example, the process 300 at 310 can use a web service and queries (e.g., jquery) to poll collectors 108 for new or updated queue-related values. If there are data changes at 308, the process 300 proceeds to 312 and, if a triggering threshold has not been reached, returns to 310. However, if there are data changes at 308 and if a triggering threshold has been reached at 312, the process 300 proceeds to 314 and adjusts an affected widget position within the UI and/or performs one or more automatic remediation actions. For example, as a result of crossing triggering threshold, the process 300 at 314 can move or relocate a widget from the low priority threat assessment zone to one of the medium priority threat assessment zone or the high priority threat assessment zone as part of providing an alerting mechanism for a corresponding server machine issue and/or automatically performing a remediation operation for the affected server machine based on the changed priority level and/or underlying data change.

At 316, the process 300 determines if one or more triggering thresholds need to be adjusted. For example, a processing queue threshold associated with one server machine may be adjusted upward due to increased processing bandwidth, whereas a storage queue threshold associated with a different server machine may need to be adjusted downward due to limited disk capacity. If one or more triggering thresholds do not need to be adjusted at 316, the process 300 returns to 310. It will be appreciated that monitoring operations may be set up on a predetermined monitoring schedule or executed as needed. If one or more triggering thresholds do need to be adjusted at 316, the process 300 proceeds to 318 and adjusts the one or more triggering thresholds accordingly before returning to 310.

FIGS. 4A-4D depict aspects of an exemplary dashboard user interface (UI) 400 populated with monitor widgets 402, 404, 406, 408, 410, and 412 monitoring a number of server computers associated with a highly distributed computer architecture. It will be appreciated that highly distributed computer architectures can typically include hundreds if not thousands of server computers and associated application services/processes which can be monitored via dashboard UI 400. Exemplary dashboard UI 400 enables visualization of real-time or near real-time server machine monitoring operations and/or threat assessments.

Figure 4A:
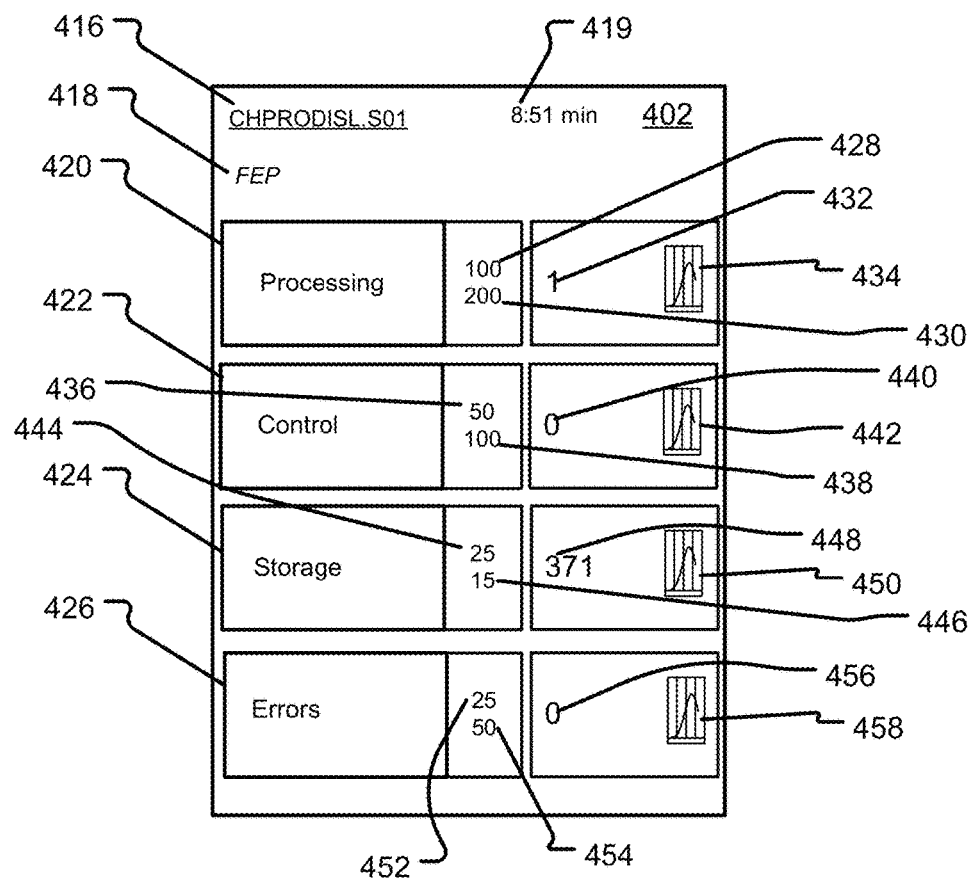
FIGS. 4A-4D depict aspects of an exemplary dashboard user interface (UI) populated with monitor widgets monitoring a number of server computers associated with a highly distributed computer architecture, according to an embodiment.

FIG. 4A depicts a structure of a monitor widget 402. Monitor widget 402 displays a name or identifier 416 of a server being monitored, a name or identifier 418 of a service or process being monitored, a time since a last update 419, a processing queue detector 420, a control queue detector 422, a storage queue detector 424, and an error queue detector 426. As shown in FIG. 4A, processing queue detector 420 includes a medium risk triggering threshold 428, a high risk triggering threshold 430, a current value 432 of the processing queue data 110 (currently a value of one), and a control interface 434 for displaying trend and/or other information associated with the processing queue data 110. For example, control interface 434 can be toggled (e.g., clicked, tapped, etc.) to display a graph of data showing a trend over some period of time for the processing queue data 110. Monitor trends can be used to predict if an operational issue will occur or is likely to occur within some time period.

Control queue detector 422 includes a medium risk triggering threshold 436, a high risk triggering threshold 438, a current value 440 of the control queue data 112 (currently a value of zero), and a control interface 442 for displaying trend and/or other information associated with the control queue data 112. Storage queue detector 424 includes a medium risk triggering threshold 444, a high risk triggering threshold 446, a current value 448 of the storage queue data 114 (currently a value of 371), and a control interface 450 for displaying trend and/or other information associated with the storage queue data 114. Error queue detector 426 includes a medium risk triggering threshold 452, a high risk triggering threshold 454, a current value 456 of the error queue data 116 (currently a value of zero), and a control interface 458 for displaying trend and/or other information associated with the error queue data 116. For this example implementation, each of the other monitor widgets 404-412 include similar features as described above for monitor widget 402.

Figure 4B:
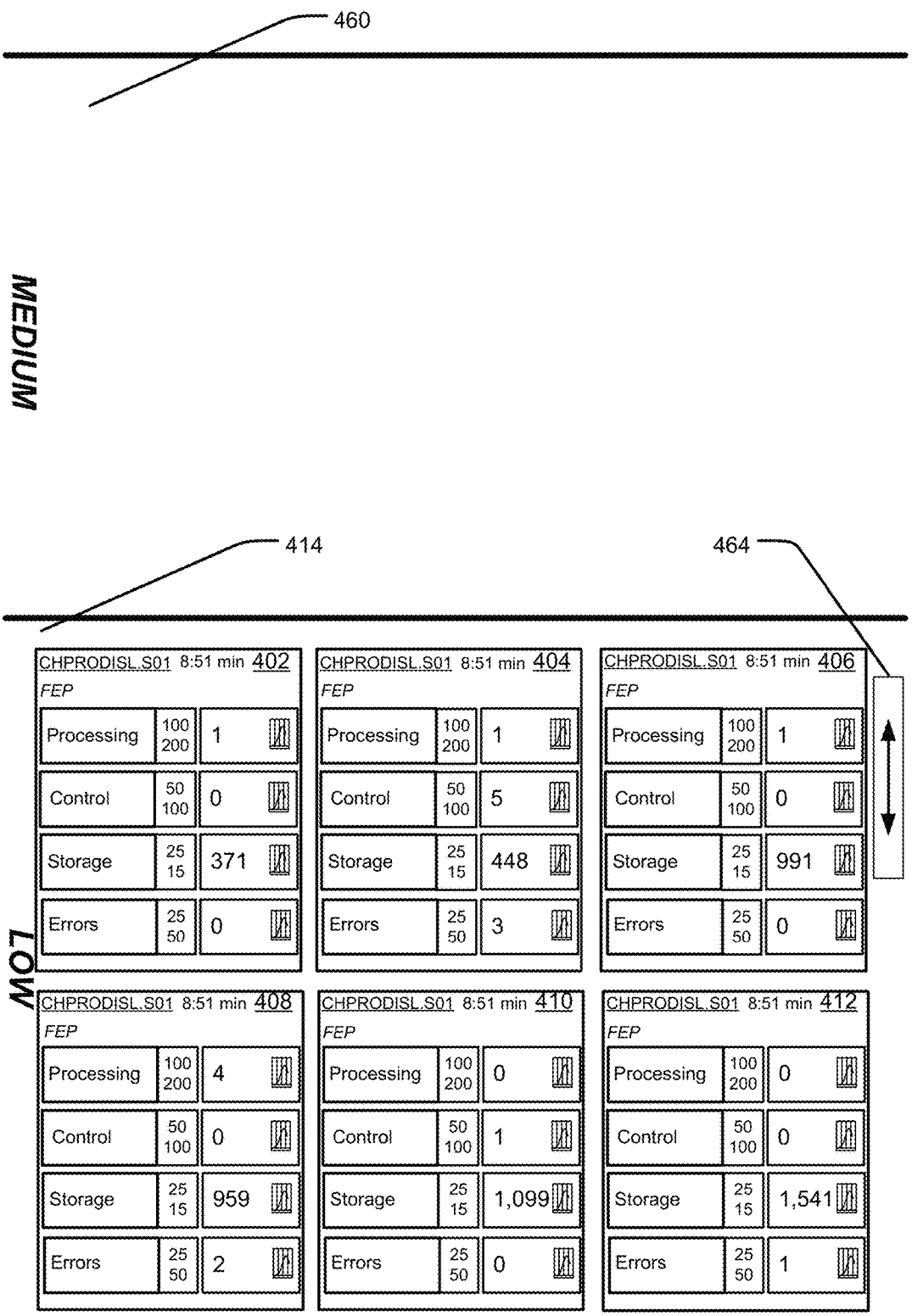

FIG. 4B depicts the dashboard UI 400 at a time when monitor widgets 402, 404, 406, 408, 410, and 412 are all positioned within a low priority threat assessment zone 414 since no monitoring data have reached or satisfied a triggering threshold associated with one or more of the widgets 402-412. In various aspects, trigger thresholds are satisfied by surpassing a given value or falling below a given value.

Figure 4C:
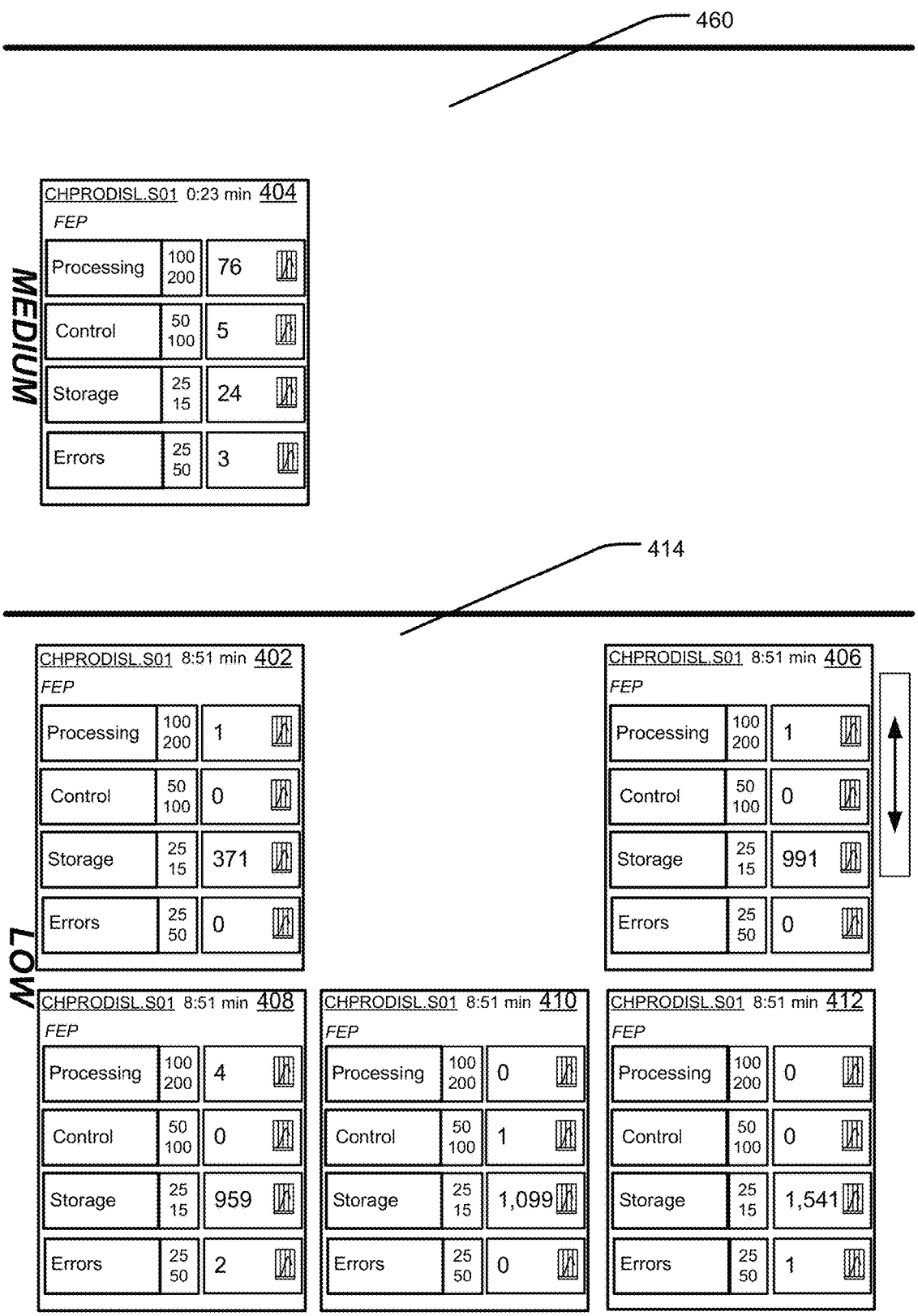

FIG. 4C depicts the dashboard UI 400 at a time subsequent to the display shown in FIG. 4B. As shown in FIG. 4B, the low priority threat assessment zone 414 is now populated with monitor widgets 402, 406, 408, 410, and 412 due to dashboard UI 400 relocating monitor widget 404 to medium priority threat assessment zone 460. The medium priority threat assessment zone 460 is configured to contain monitor widgets having higher operational risks as compared with monitor widgets contained in the low priority threat assessment zone 414. For this example, the dashboard UI 400 has dynamically relocated the monitor widget 404 from the low priority threat assessment zone 414 to the medium priority threat assessment zone 460 since the value (currently 24) of the storage queue data 114 associated with the storage queue detector 424 has satisfied the first triggering threshold 444 of 25.

Figure 4D:
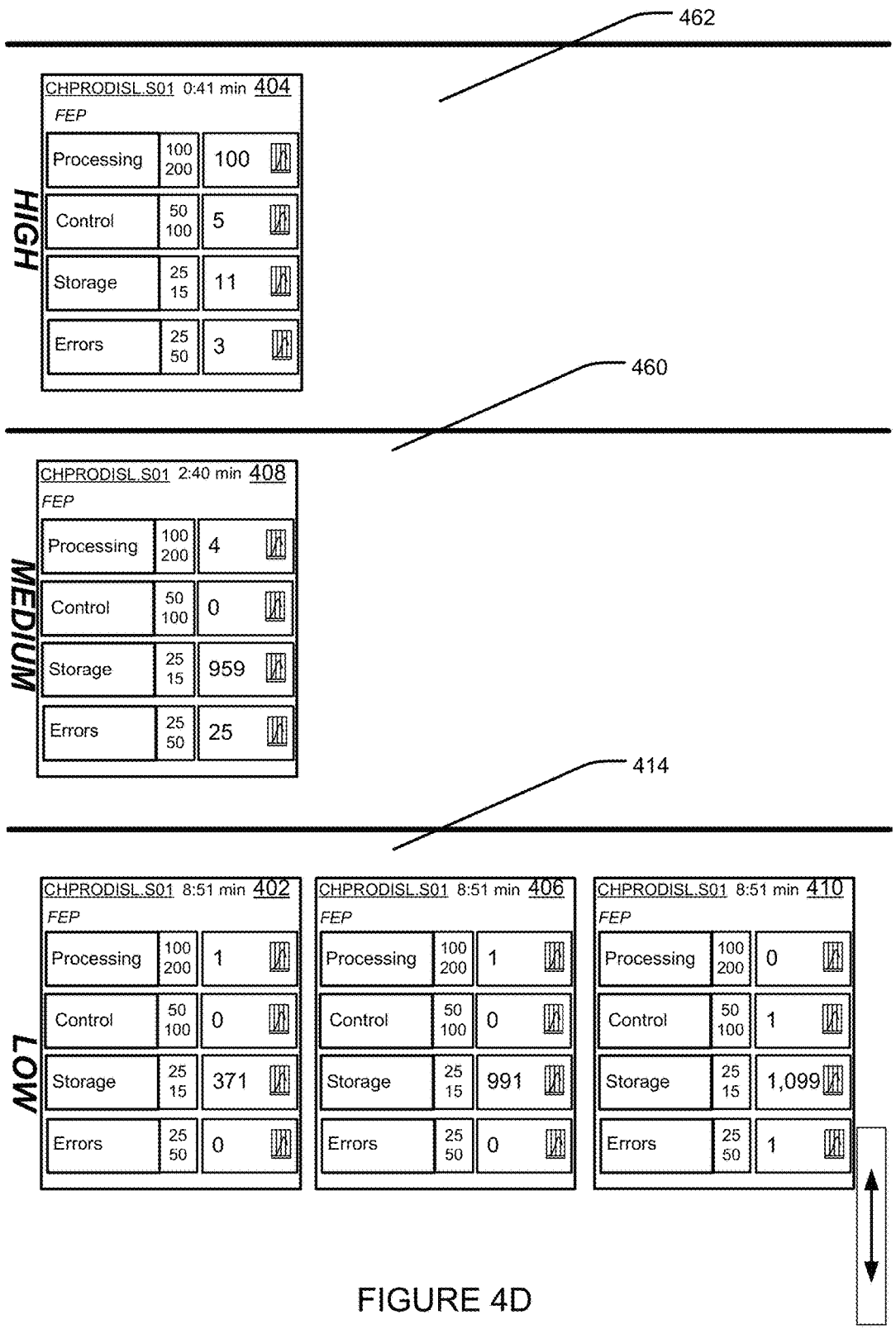

FIG. 4D depicts the dashboard UI 400 at a time subsequent to the display shown in FIG. 4C. As shown in FIG. 4D, the low priority threat assessment zone 414 is now populated with monitor widgets 402, 406, 410, (412 not shown) due to dashboard UI 400 relocating monitor widget 408 to the medium priority threat assessment zone 460 since the value (currently 25) of the error queue data 116 associated with the error queue detector 426 has reached the first triggering threshold 452 of 25. For example, the error value of 25 provided by monitor widget 408 reveals an application level exception problem that may have resulted due to a code bug that caused a number of exceptions when attempting to process messages.

As shown in FIG. 4D, dashboard UI 400 has also relocated monitor widget 404 to a now visible high priority threat assessment zone 462 since the value (currently 100) of the processing queue data 110 associated with the processing queue detector 420 has reached the first triggering threshold 428 of 100 and the value (currently 11) of the storage queue data 114 associated with the storage queue detector 424 has satisfied the second triggering threshold 446 of 15. For example, a storage capacity limitation has caused a processing backlog which is revealed by dynamic relocation of the monitor widget 404 to the high priority threat assessment zone 462. The high priority threat assessment zone 462 is configured to contain monitor widgets having higher operational risks as compared with monitor widgets contained in either the low priority threat assessment zone 414 or the medium priority threat assessment zone 460. Scroll control 464 or another type of mechanism can be used to scroll through the low priority threat assessment zone 414, the medium priority threat assessment zone 460, and/or high priority threat assessment zone 462.

In certain embodiments, colors and/or other visualization effects can be used to differentiate first and second monitoring thresholds as well as the different priority threat assessment zones 414, 460, and 462. For example, a first triggering threshold (medium type) may be depicted in yellow whereas a second triggering threshold (high type) may be depicted in red. As further example, low priority threat assessment zone 414 may be depicted in green, medium priority threat assessment zone 460 may be depicted in yellow, and high priority threat assessment zone 462 may be depicted in red to provide real-time visual feedback to users of dashboard UI 400. It will be appreciated that dashboard UI 400 provides one example implementation and other implementations are available. Dashboard UI 400 can be displayed on a variety of endpoint devices, including large monitors, desktop displays, laptop and tablet displays, smartphone screens, etc.

Figure 5:
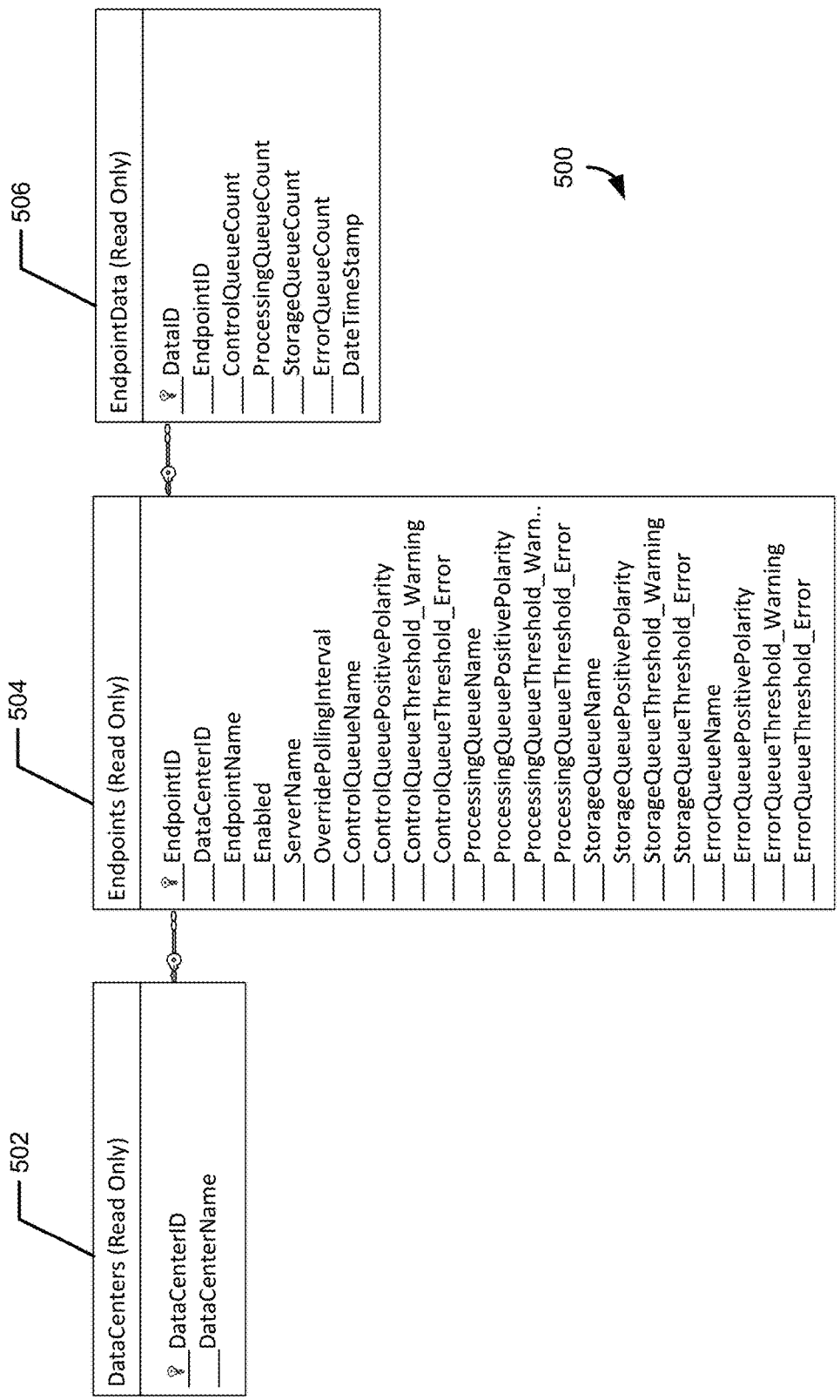
FIG. 5 is a block diagram that depicts an exemplary database schema, according to an embodiment.

FIG. 5 is a block diagram that depicts an exemplary database schema 500 for use in storing/using information to database 118 and/or caching tier 120, according to an embodiment. As shown in FIG. 5, database schema 500 includes a DataCenter table 502, an Endpoints table 504, and an EndpointData table 506. As shown in FIG. 5, DataCenter table 502 of one embodiment includes a DataCenterID element and a DataCenterName element.

Endpoints table 504 of one embodiment includes an EndpointID element, a DataCenterID element, an EndpointName element, an Enabled element, a ServerName element, an OverridePollingInterval element, a ControlQueueName element, a ControlQueuePositivePolarity element, a ControlQueueThreshold_Warning element, a ControlQueueThreshold_Error element, a ProcessingQueueName element, a ProcessingQueuePositivePolarity element, a ProcessingQueueThreshold_Warning element, a ProcessingQueueThreshold_Error element, StorageQueueName element, a StorageQueuePositivePolarity element, a StorageQueueThreshold_Warning element, a StorageQueueThreshold_Error element, an ErrorQueueName element, an ErrorQueuePositivePolarity element, an ErrorQueueThreshold_Warning element, and an ErrorQueueThreshold_Error element.

EndpointData table 506 of one embodiment includes a DataID element, an EndpointID element, a ControlQueueCount element, ProcessingQueueCount element, a StorageQueueCount element, an ErrorQueueCount element, and a DateTimeStamp element.

Figure 6:
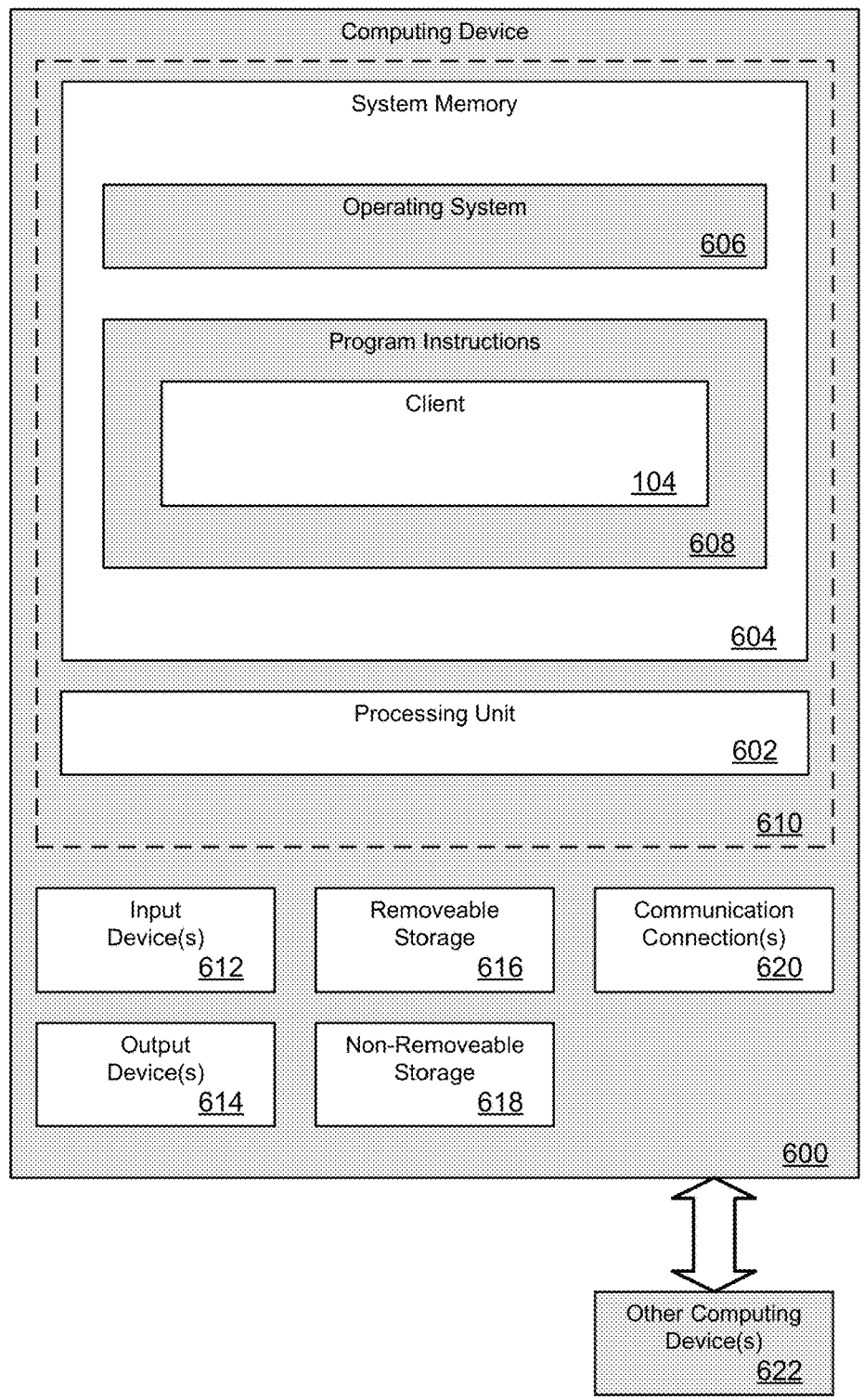
FIG. 6 is a block diagram illustrating physical components of an example computing device with which aspects may be practiced.

FIG. 6 is a block diagram illustrating physical components of an example computing device 600 with which aspects may be practiced. The computing device 600 may include at least one processing unit or processor 602 and a system memory 604. The system memory 604 may comprise, but is not limited to, volatile (e.g. random access memory (RAM)), non-volatile (e.g. read-only memory (ROM)), flash memory, or any combination thereof. System memory 604 may include operating system 606, one or more program instructions 608 including an automated executable having sufficient computer-executable instructions, which when executed, perform functionalities and features as described herein.

Operating system 606, for example, may be suitable for controlling the operation of computing device 600 and for instantiating a communication session between one or more local or remote systems/devices. Furthermore, aspects may be practiced in conjunction with a graphics library, other operating systems, or any other application program and is not limited to any particular application or system. This basic configuration is illustrated by those components within a dashed line 610. Computing device 600 may also include one or more input device(s) 612 (keyboard, mouse, pen, touch input device, etc.) and one or more output device(s) 614 (e.g., display, speakers, a printer, etc.).

The computing device 600 may also include additional data or memory storage devices (removable or non-removable) such as, for example, magnetic disks, optical disks, caching data structures, tape, etc. Such additional storage is illustrated by a removable storage 616 and a non-removable storage 618. Computing device 600 may also contain a communication connection 620 that may allow computing device 600 to communicate with other computing devices 622, such as over a network in a distributed computing environment, for example, an intranet or the Internet. Communication connection 620 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media does not include computer-readable transmission media.

Aspects described herein may be used in various distributed computing environments where tasks are performed by remote processing devices that are linked through a communications network. Aspects described herein may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 600 or any other computing devices 622, in combination with computing device 600, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A distributed computer system comprising:
 a first server that includes a collector to collect processing queue data, storage queue data, control queue data, and error queue data associated with the first server;
 a second server that includes a collector to collect processing queue data, storage queue data, control queue data, and error queue data associated with the second server;

a third server that includes a collector to collect processing queue data, storage queue data, control queue data, and error queue data associated with the third server;

a monitor server communicatively coupled to the first server, the second server, and the third server via one or more computer networks, wherein the monitor server receives the processing queue data, the storage queue data, the control queue data, and the error queue data from each of the first server, the second server, and the third server;

a storage database to store the processing queue data, the storage queue data, the control queue data, and the error queue data collected from each of the first server, the second server, and the third server; and a caching tier to store most recent processing queue data, most recent storage queue data, most recent control queue data, and most recent error queue data collected from each of the first server, the second server, and the third server.

2. The system of claim 1, further comprising:

a web service to extract, from the caching tier, the most recent processing queue data, the most recent storage queue data, the most recent control queue data, and the most recent error queue data from each of the first server, the second server, and the third server; and a dashboard user interface (UI) to display aspects of the processing queue data, the storage queue data, the control queue data, and the error queue data for each of the first server, the second server, and the third server.

3. The system of claim 2, wherein the dashboard UI operates, for each of the first server, the second server, and the third server, to display a first threshold and a second threshold associated with the processing queue data, a first threshold and a second threshold associated with the storage queue data, a first threshold and a second threshold associated with the control queue data, and a first threshold and a second threshold associated with the error queue data.

4. The system of claim 3, wherein the dashboard UI operates, for each of the first server, the second server, and the third server, further to display a processing queue value, a storage queue value, a control queue value, and an error queue value.

5. The system of claim 4, wherein the dashboard UI operates further to display:

a server name, a process type, and a time elapsed since displaying a first widget containing the processing queue value, the storage queue value, the control queue value, and the error queue value associated with the first server;

a server name, a process type, and a time elapsed since displaying a second widget containing the processing queue value, the storage queue value, the control queue value, and the error queue value associated with the second server; and a server name, a process type, and a time elapsed since displaying a third widget containing the processing queue value, the storage queue value, the control queue value, and the error queue value associated with the third server.

6. The system of claim 2, wherein the dashboard UI operates to display:

a first widget for the first server that displays: an identifier for the first server, a process type running on the first server, a first threshold and a second threshold associated with the processing queue data for the first server, a first threshold and a second threshold associated with the storage queue data for the first server, a first threshold and a second threshold associated with the control queue data for the first server, and a first threshold and a second threshold associated with the error queue data for the first server;

a second widget for the second server that displays: an identifier for the second server, a process type running on the second server, a first threshold and a second threshold associated with the processing queue data for the second server, a first threshold and a second threshold associated with the storage queue data for the second server, a first threshold and a second threshold associated with the control queue data for the second server, and a first threshold and a second threshold associated with the error queue data for the second server; and a third widget for the third server that displays: an identifier for the third server, a process type running on the third server, a first threshold and a second threshold associated with the processing queue data for the third server, a first threshold and a second threshold associated with the storage queue data for the third server, a first threshold and a second threshold associated with the control queue data for the third server, and a first threshold and a second threshold associated with the error queue data for the third server.

7. The system of claim 6, wherein the dashboard UI operates to display a low priority section, a medium priority section, and a high priority section to contain one or more of the first widget, the second widget, and the third widget.

8. The system of claim 7, wherein the dashboard UI operates to relocate one or more of the first widget, the second widget, and the third widget from a current priority section to a new priority section.

9. The system of claim 8, wherein the dashboard UI displays the low priority section below or to the left of the medium priority section and displays the medium priority section below or to the left of the high priority section.

10. The system of claim 1, wherein the dashboard UI includes a control interface that operates to display trending data associated with one or more of the processing queue data, the storage queue data, the control queue data, and the error queue data for each one of the first server, the second server, and the third server.

11. The system of claim 1, further comprising:

a processing queue to maintain a number of transactions to process for each of the first server, the second server, and the third server;

a storage queue to maintain a current processing capacity for each of the first server, the second server, and the third server;

a control queue to maintain notifications of an ability to process one or more transactions for each of the first server, the second server, and the third server; and an error queue to maintain a number of error messages for each of the first server, the second server, and the third server.

12. A method performed in a distributed computer architecture that includes a number of monitored servers, the method comprising:

installing a collector on each monitored server associated with the distributed computer architecture;

using the collector to collect processing queue data, storage queue data, control queue data, and error queue data from each monitored server associated with the distributed computer architecture;

storing, in a database, the processing queue data, storage queue data, control queue data, and error queue data for each monitored server associated with the distributed computer architecture;

caching most recent processing queue data, most recent storage queue data, most recent control queue data, and most recent error queue data for each monitored server associated with the distributed computer architecture; and displaying aspects of the processing queue data, the storage queue data, the control queue data, and the error queue data for each monitored server associated with the distributed computer architecture, wherein the displaying includes displaying threat assessment thresholds and current values associated with the processing queue data, the storage queue data, the control queue data, and the error queue data for each monitored server associated with the distributed computer architecture.

13. The method of claim 12, further comprising displaying a widget for each monitored server associated with the distributed computer architecture including:

displaying a first threshold, a second threshold, and a current value associated with the processing queue data for each widget;

displaying a first threshold, a second threshold, and a current value associated with the storage queue data for each widget;

displaying a first threshold, a second threshold, and a current value associated with the control queue data for each widget; and displaying a first threshold, a second threshold, and a current value associated with the error queue data for each widget.

14. The method of claim 13, further comprising displaying each widget in one or more of a low priority section, a medium priority section, and a high priority section.

15. The method of claim 14, further comprising relocating a widget from one of the low priority section, the medium priority section, and the high priority section to a different section.

16. The method of claim 14, further comprising using different colors to distinguish the low priority section, the medium priority section, and the high priority section.

17. The method of claim 12, further comprising providing at least one control interface with each widget that operates to display trending data associated with one or more of the processing queue data, the storage queue data, the control queue data, and the error queue data.

18. A non-transitory computer readable medium that includes instructions which, when executed as part of a distributed computer architecture:

receive processing queue data, storage queue data, control queue data, and error queue data from each monitored server associated with the distributed computer architecture;

store, in a database, the processing queue data, storage queue data, control queue data, and error queue data for each monitored server associated with the distributed computer architecture;

cache most recent processing queue data, most recent storage queue data, most recent control queue data, and most recent error queue data for each monitored server associated with the distributed computer architecture; and display aspects of the processing queue data, the storage queue data, the control queue data, and the error queue data for each monitored server associated with the distributed computer architecture, wherein to display includes a display of threat assessment thresholds and current values associated with the processing queue data, the storage queue data, the control queue data, and the error queue data for each monitored server associated with the distributed computer architecture.

19. The non-transitory computer readable medium of claim 18, further configured to display a widget for each monitored server associated with the distributed computer architecture including:

displaying a first threshold, a second threshold, and a current value associated with the processing queue data for each widget;

displaying a first threshold, a second threshold, and a current value associated with the storage queue data for each widget;

displaying a first threshold, a second threshold, and a current value associated with the control queue data for each widget; and displaying a first threshold, a second threshold, and a current value associated with the error queue data for each widget.

20. The non-transitory computer readable medium of claim 19, further configured to provide at least one control interface with each widget that operates to display trending data associated with one or more of the processing queue data, the storage queue data, the control queue data, and the error queue data.

* * * * *

UNITED STATES PATENT AND TRADEMARK OFFICE
CERTIFICATE OF CORRECTION

| | | |
|---|---|---|
| PATENT NO. | : 10,362,135 B2 | Page 1 of 1 |
| APPLICATION NO. | : 15/438308 | |
| DATED | : July 23, 2019 | |
| INVENTOR(S) | : McNeece et al. | |

It is certified that error appears in the above-identified patent and that said Letters Patent is hereby corrected as shown below:

On the Title Page

Items [12], [72], delete "Brian McNeese," and insert --Brian McNeece,--

Signed and Sealed this
Thirty-first Day of March, 2020

Andrei Iancu
*Director of the United States Patent and Trademark Office*